March 16, 1937. A. F. WELCH 2,074,136
RESILIENT MOUNTING
Filed May 25, 1934 2 Sheets-Sheet 1

Inventor:
Alfred F. Welch,
by Harry E. Dunham
His Attorney.

March 16, 1937.　　　A. F. WELCH　　　2,074,136

RESILIENT MOUNTING

Filed May 25, 1934　　　2 Sheets-Sheet 2

Inventor:
Alfred F. Welch,
by Harry E. Dunham
His Attorney.

Patented Mar. 16, 1937

2,074,136

UNITED STATES PATENT OFFICE 2,074,136

RESILIENT MOUNTING

Alfred F. Welch, Fort Wayne, Ind., assignor to General Electric Company, a corporation of New York Application May 25, 1934, Serial No. 727,432

10 Claims. (Cl. 248—26)

My invention relates to a mounting for resiliently supporting dynamo-electric machines and the like.

An object of my invention is to provide a mounting which will resiliently cushion the torsional vibration of dynamo-electric machines or the like and which will be relatively rigid to external forces applied to the machine. I accomplish this object by providing a mounting having an annulus of resilient material fitted on a hub on the machine for cushioning the vibrations and an improved arrangement for supporting the annulus.

Further objects and advantages of my invention will become apparent as the following description proceeds, and the features of novelty which characterize my invention will be pointed out with particularity in the claims annexed to and forming a part of this specification.

Figure 1:
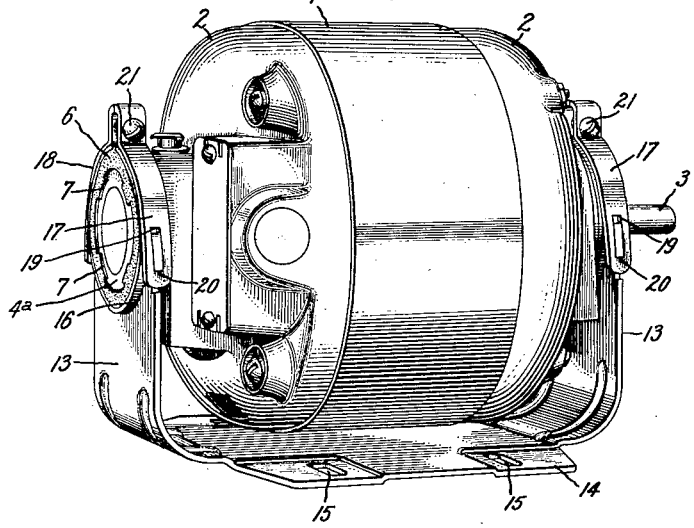
Figure 2:
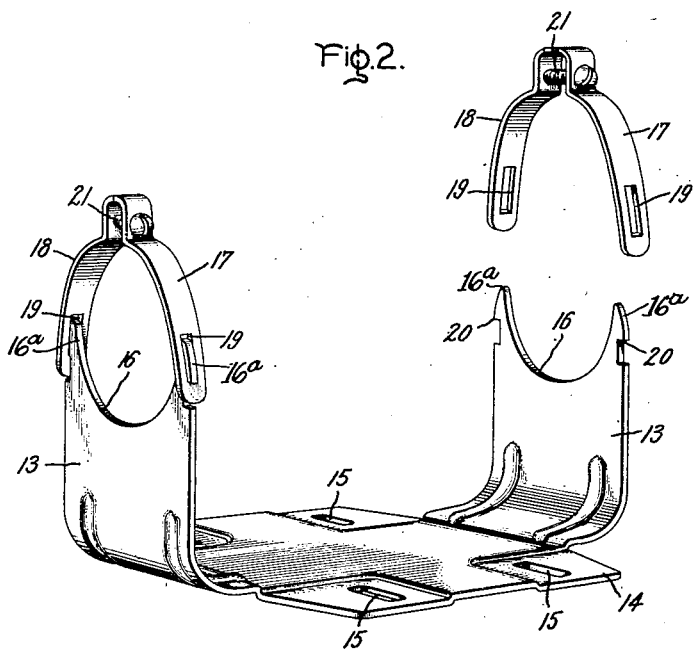
Figure 3:
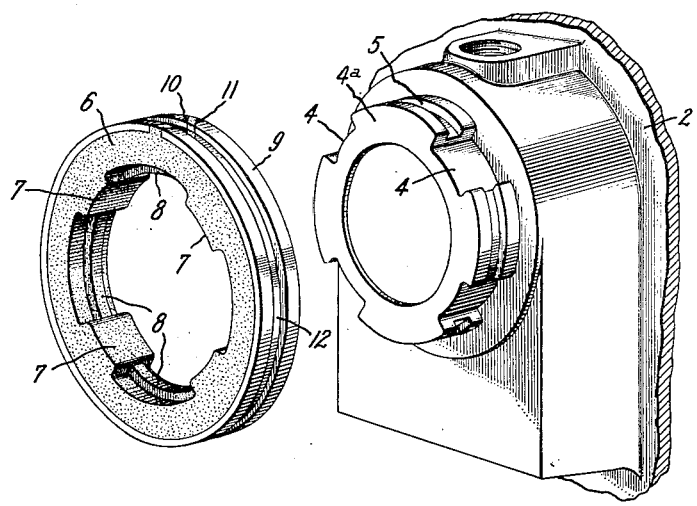
Figure 4:
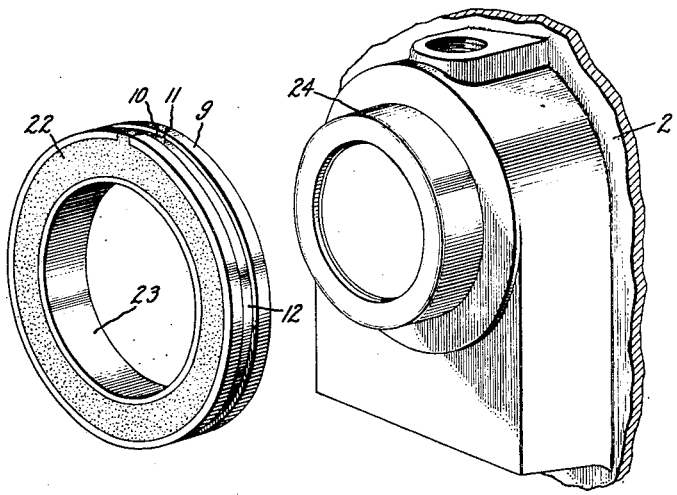

For a better understanding of my invention, reference may be had to the accompanying drawings in which Fig. 1 is a perspective view of a mounting embodying my invention supporting a dynamo-electric machine; Fig. 2 is an exploded view of the supporting base; Fig. 3 is a fragmentary exploded view of a portion of the stationary member of the dynamo-electric machine and the annulus of resilient material; and Fig. 4 is a view of a modification of my invention.

I have shown my invention applied to a dynamo-electric machine having a stationary member comprising a frame 1 to which are secured end shields 2. The rotating member of the dynamo-electric machine is secured to a shaft 3 which is journalled in the end shields 2. Each of the end shields 2 has an integral hub 4a concentric with the axis of the shaft 3 and having axially-extending notches 4 and circumferential grooves 5 therein. The grooves 5 are formed in the portions of the hub intermediate the notches 4.

The vibration of the stationary member is cushioned by an annulus or ring 6 of resilient material, preferably rubber, having complementary portions at the inner surface thereof consisting of projections 7 and circumferential ribs 8 respectively engaging the notches 4 and the grooves 5. The projections, which engage the notches 4, cushion torsional vibration and prevent relative rotation between the annulus of resilient material and the stationary member of the dynamo-electric machine. The ribs 8 which engage the grooves 5 prevent axial movement of the stationary member with respect to the annulus of resilient material. A metal or other rigid band 9 having spaced ends 10 and 11 and a circumferential groove 12 therein is secured or joined to the outer surface of the annulus 6 preferably by bonding the band directly to the resilient material. The annulus 6 is fitted on the hub 4a of the end shield 2 by aligning the projections 7 with the notches 4 and pressing the annulus in place.

The base for supporting the motor is U shape and comprises vertical supports 13 arranged at either end of the dynamo-electric machine, and an integral horizontal plate 14 having mounting holes 15 therein. The supports 13 have spaced apart ends 16a, the arcuate edges 16 of which engage the grooves 12 in the bands 9 at opposite ends of the motor. The ends 16 are preferably formed so that the spaced ends 10 and 11 of the metal bands are compressed when the annulus of resilient material is clamped in place in the support 13. Each of the bands 9 are secured in the upper ends of the supports 13 by clamps comprising parts 17 and 18 having slots 19 therein engaging projections 20 formed by notching the support. A bolt 21 projecting through the part 17 and threaded in the part 18 draws the parts 17 and 18 together and forces the groove 12 into firm frictional engagement with the edges of the end 16 of the support. By this arrangement, the inner surface of the resilient material is secured to the stationary member of the dynamo-electric machine, and the bands 9, which are bonded to the outer surface of the annulus 6, are secured to the support. Torsional vibration of the stationary member is cushioned by circumferential shear of the resilient material. Transverse forces on the stationary member such as caused by belt pull are resisted by compression of the resilient material. Since the resilient material is relatively rigid in compression, the mounting is relatively rigid to belt pull. The metal band distributes the forces over the surface of the rubber and provides a rigid outer surface for attaching the annulus to the support which is not affected by deterioration of the resilient material. This is an important feature since it is desirable that the support remain fixed to the outer surface of the annulus throughout the life of the mounting. Axial forces on the stationary member are resisted by the ribs 8 which fit within the grooves 5 in the hub 4a of the stationary member. The exposed surfaces of the rubber are preferably coated with a flexible protective varnish to prevent deterioration of the rubber and protect it from oil. The dynamo-electric machine is readily inserted in the mounting by removing the clamps. Before the clamps are tightened, the dynamo-electric machine may be turned with respect to the support so that the base may be attached to other than horizontal surfaces and the machine will be held upright.

In Fig. 4 I have shown a fragmentary view of a modification of my invention. The cushioning member of the mounting comprises an annulus or ring 22 of resilient material having a continuous annular metal band 23 bonded to the inner surface thereof and providing a rigid inner surface for attaching to the hub 24. The metal band 23 is secured to the stationary member by forcing the band over a hub 24 formed on the outer ends of the end shield 2 concentrically with the axis of rotation of the shaft. A metal band 9 having spaced ends 10 and 11 and a circumferential groove 12 is secured to the outer surface of the annulus 22 preferably by bonding the band directly to the material. This modification differs from the previously described embodiment of my invention only in the manner of securing the inner surface of the annulus 22 to the stationary member of the dynamo-electric machine. The remaining features of the mounting are identical.

Although I have shown a particular embodiment of my invention, I do not desire to be limited to the construction described, and I intend in the appended claims to cover all modifications which do not depart from the spirit and scope of my invention.

What I claim as new and desire to secure by Letters Patent of the United States, is:

1. A dynamo-electric machine or the like having a rotatable member and a stationary member provided with a hub, an annulus of resilient material fitted on said hub, a metal band secured to the outer surface of said annulus and joined thereto, said metal band having a circumferential groove therein, and means utilizing torsional resistance of said annulus of resilient material and including a support having edges engaging the groove in said metal band for absorbing torsional vibration of said machine and for resiliently supporting said machine.

2. A dynamo-electric machine or the like having a rotatable member and a stationary member provided with a hub, an annulus of resilient material fitted on said hub, a metal band secured to the outer surface of said annulus, said band having a circumferential groove therein, a support having spaced apart ends and an edge engaging said groove for supporting the machine, and means utilizing torsional resistance of said annulus of resilient material and including a clamp engaging said support and securing said groove in engagement with the edges of said support for absorbing torsional vibration of said machine and for resiliently supporting said machine.

3. A dynamo-electric machine or the like having a rotatable member and a stationary member, said stationary member being provided with a hub having axially extending notches and a circumferential groove therein, an annulus of resilient material having complementary portions on the inner surface thereof adapted to engage said notches and said groove, a metal band secured to the outer surface of said annulus, and means including a support secured to said band for supporting said machine.

4. A dynamo-electric machine or the like having a rotatable member and a stationary member, said stationary member being provided with a hub having axially extending notches and a circumferential groove therein, an annulus of resilient material having complementary portions on the inner surface thereof adapted to engage said notches and said groove, a metal band secured to the outer surface of said annulus and having spaced ends, a support having spaced apart ends engaging said band, and means including a clamp engaging said support and forcing said band into engagement with said support for securing said band to said support.

5. A dynamo-electric machine or the like having a rotatable member and a stationary member, said stationary member being provided with a hub having axially extending notches and a circumferential groove therein, an annulus of resilient material having complementary portions on the inner surface thereof adapted to engage said notches and said groove, a metal band secured to the outer surface of said annulus and having spaced ends, a support having an open end engaging said band and having a notch therein, and means including a clamp having a slot therein engaging the notch in said support for securing said band to said support.

6. A dynamo-electric machine or the like having a rotatable member provided with a shaft and a stationary member provided with a hub, said hub having notches and a circumferential groove therein, an annulus of resilient material having complementary portions adapted to engage said notches and said groove, and means including a support engaging said annulus of resilient material for supporting said machine.

7. A dynamo-electric machine or the like having a rotatable member and a stationary member provided with a hub, an annulus of resilient material fitted on said hub, said annulus having a rigid outer surface with a circumferential groove therein, and means utilizing torsional resistance of said annulus of resilient material and including a support having edges engaging said groove for absorbing torsional vibration of said machine and for resiliently supporting said machine.

8. A dynamo-electric machine or the like having a rotatable member and a stationary membe.', said stationary member being provided with a hub having axially extending notches and a circumferential groove therein, an annulus of resilient material having complementary portions on the inner surface thereof adapted to engage said notches and said groove and having a rigid outer surface, a support engaging said rigid outer surface for supporting said machine, and means including a clamp engaging said support for securing said rigid surface to said support.

9. A dynamo-electric machine or the like having a rotatable member provided with a shaft and a stationary member provided with a hub extending about said shaft, an annulus of resilient material fitted on said hub, a rigid band secured to the outer surface of said annulus, said rigid band having a circumferential groove therein, and means utilizing torsional resistance of said annulus of resilient material and including a support having projections and edges engaging said groove in said rigid band for absorbing torsional vibration of said machine and for resiliently supporting said machine, said last mentioned means including a clamp engaging said rigid band and having slots receiving said projections on said support.

10. A support for a dynamo-electric machine having a hub comprising a sheet metal base having an arcuate end adapted to receive the hub for supporting said machine, projections on opposite sides of the arcuate end of said base, and means including a clamp having slots engaging said projections for securing the hub to said base.

ALFRED F. WELCH.